(12) United States Patent
Singh et al.

(10) Patent No.: US 10,059,869 B2
(45) Date of Patent: Aug. 28, 2018

(54) TREATMENT FLUIDS AND USES THEREOF (71) Applicant: Halliburton Energy Services, Inc., Houston, TX (US)

(72) Inventors: Dipti Singh, Kingwood, TX (US); Janette Cortez, Kingwood, TX (US); James William Ogle, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/035,977

(22) PCT Filed: Feb. 20, 2014

(86) PCT No.: PCT/US2014/017299
§ 371 (c)(1),
(2) Date: May 11, 2016

(87) PCT Pub. No.: WO2015/126395
PCT Pub. Date: Aug. 27, 2015

(65) Prior Publication Data
US 2016/0272869 A1    Sep. 22, 2016

(51) Int. Cl.
| | | |
|---|---|---|
| *C09K 8/12* | (2006.01) | |
| *C09K 8/68* | (2006.01) | |
| *C09K 8/88* | (2006.01) | |
| *C09K 8/90* | (2006.01) | |
| *C04B 28/02* | (2006.01) | |
| *C04B 28/14* | (2006.01) | |
| *C09K 8/10* | (2006.01) | |
| *C09K 8/52* | (2006.01) | |
| *C09K 8/72* | (2006.01) | |
| *C09K 8/528* | (2006.01) | |

(52) U.S. Cl.
CPC ............... *C09K 8/12* (2013.01); *C04B 28/02* (2013.01); *C04B 28/14* (2013.01); *C09K 8/10* (2013.01); *C09K 8/52* (2013.01); *C09K 8/68* (2013.01); *C09K 8/685* (2013.01); *C09K 8/725* (2013.01); *C09K 8/88* (2013.01); *C09K 8/882* (2013.01); *C09K 8/887* (2013.01); *C09K 8/90* (2013.01); *C09K 8/528* (2013.01); *C09K 2208/08* (2013.01); *C09K 2208/24* (2013.01); *C09K 2208/26* (2013.01); *C09K 2208/32* (2013.01); *Y02W 30/92* (2015.05); *Y02W 30/94* (2015.05)

(58) Field of Classification Search
CPC ...... E21B 43/267; E21B 43/26; E21B 33/138; E21B 2034/007; E21B 21/003; E21B 33/068; E21B 33/1208; E21B 33/134; E21B 33/14; E21B 34/12; E21B 43/04; E21B 43/14; E21B 43/16; E21B 43/243; E21B 43/255; E21B 47/06; E21B 43/25; C09K 2208/08; C09K 8/035; C09K 11/02; C09K 11/565; C09K 11/70; C09K 15/12; C09K 15/322; C09K 8/40; C09K 8/426; C09K 8/50; C09K 8/514; C09K 8/516; C09K 8/575; C09K 8/60; C09K 8/62; C09K 8/80; C09K 8/805

See application file for complete search history.

(56) References Cited

U.S. PATENT DOCUMENTS

| | | | |
|---|---|---|---|
| 4,839,095 A | 6/1989 | Lahalih et al. | |
| 6,194,355 B1 | 2/2001 | Jarrett et al. | |
| 2006/0157248 A1* | 7/2006 | Hoefer .................... | C09K 8/12 166/300 |
| 2007/0042913 A1* | 2/2007 | Hutchins .................. | C09K 8/68 507/269 |
| 2008/0269080 A1 | 10/2008 | Hutchins et al. | |
| 2012/0103615 A1 | 5/2012 | Scherman et al. | |
| 2012/0305254 A1 | 12/2012 | Chen et al. | |

FOREIGN PATENT DOCUMENTS

| | | |
|---|---|---|
| CA | 2570526 | 1/2006 |
| WO | WO-2015126395 A1 | 8/2015 |

OTHER PUBLICATIONS

"International Application Serial No. PCT/US2014/017299, International Preliminary Report on Patentability dated Sep. 1, 2016", 9 pgs.
"International Application Serial No. PCT/US2014/017299, International Search Report dated Nov. 20, 2014", 3 pgs.
"International Application Serial No. PCT/US2014/017299, Written Opinion dated Nov. 20, 2014", 7 pgs.

* cited by examiner

Primary Examiner — Kumar R Bhushan
(74) Attorney, Agent, or Firm — Chamberlain Hrdlicka (57) ABSTRACT

A method comprises obtaining or providing a treatment fluid comprising a viscosifier polymer; an aqueous carrier fluid comprising high total dissolved solids; and a polymer composition comprising at least one of polyvinyl alcohol and polylactic acid. In some embodiments, the treatment fluid has a viscosity at 140C and at a shear rate of about $0.1\ s^{-1}$ to about $1\ s^{-1}$ of about 1,500 cP to about 10,000 cP. The method includes placing the treatment fluid in a subterranean formation.

17 Claims, 4 Drawing Sheets

TREATMENT FLUIDS AND USES THEREOF

PRIORITY APPLICATIONS

This application is a U.S. National Stage Filing under 35 U.S.C. § 371 from International Application No. PCT/US2014/017299, filed on Feb. 20, 2014; and published as WO 2015/126395 on Aug. 27, 2015; which application and publication are incorporated herein by reference in their entirety.

BACKGROUND OF THE INVENTION

During the drilling, completion, and production phases of wells for petroleum extraction, the downhole use of compositions having high viscosities, including gels, is important for a wide variety of purposes. Higher viscosity fluids can more effectively carry materials (e.g., proppants) to a desired location downhole. Similarly, higher viscosity fluids can more effectively carry materials away from a drilling location downhole. Further, the use of higher viscosity fluids during hydraulic fracturing generally results in larger, more dominant fractures.

Higher viscosity fluids are often prepared using fresh water, brine or sea water as base component. Fresh water, however, can be a scarce and costly resource, depending on where the fluid is being prepared or used. Further, brine, sea water or fluids (e.g., water) generally containing high total dissolved solids (TDS), including seawater, flowback water, produced water, formation water, salt-fortified fresh water, salt-fortified sea water, and heavy brine solutions, can adversely affect the viscosity of the fluids.

SUMMARY OF THE INVENTION

The present disclosure relates to, among other things, methods for making and using higher viscosity fluids, where the presence of high TDS does not adversely impact the viscosity of fluids. In some embodiments, the presence of high TDS results in an increase in the viscosity of certain fluids.

In various embodiments, the invention relates to a method comprising obtaining or providing a treatment fluid comprising a viscosifier polymer; an aqueous carrier fluid comprising high total dissolved solids; and a polymer composition comprising at least one of polyvinyl alcohol and polylactic acid; wherein the treatment fluid has a viscosity at 140° F. and at a shear rate of about 0.1 s$^{-1}$ to about 1000 s$^{-1}$ of about 30 cP to about 10,000 cP; and placing the treatment fluid in a subterranean formation.

Various other embodiments relate to a composition comprising:
a viscosifier polymer;
a crosslinking agent;
an aqueous carrier fluid comprising high total dissolved solids; and
at least one of a polyvinyl alcohol homopolymer comprising a structure of the formula:

wherein $R_1$ is hydrogen or a $C_1$-$C_{30}$ hydrocarbyl group; n is an integer from about 1,000 to about 10,000, and
a polylactic acid homopolymer comprising a structure of the formula:

wherein $R_1$ is hydrogen or a $C_1$-$C_{30}$ hydrocarbyl group, p is an integer from about 600 to about 7,000;
wherein the treatment fluid has a viscosity at 140° C. and at a shear rate of about 0.1 s$^{-1}$ to about 1 s$^{-1}$ of about 1,500 cP to about 10,000 cP.

Still other embodiments relate to a method comprising:
placing a treatment fluid comprising:
a viscosifier polymer;
a crosslinking agent;
an aqueous carrier fluid comprising high total dissolved solids; and
at least one of a polyvinyl alcohol homopolymer comprising a structure of the formula:

wherein $R_1$ is hydrogen or a $C_1$-$C_{30}$ hydrocarbyl group; n is an integer from about 1,000 to about 10,000, and
a polylactic acid homopolymer comprising a structure of the formula:

wherein $R_1$ is hydrogen or a $C_1$-$C_{30}$ hydrocarbyl group, p is an integer from about 600 to about 7,000;
wherein the treatment fluid has a viscosity at 140° C. and at a shear rate of about 0.1 s$^{-1}$ to about 1 s$^{-1}$ of about 1,500 cP to about 10,000 cP;
in a subterranean formation.

Various other embodiments relate to a method comprising:
obtaining or providing a treatment fluid comprising:
a viscosifier polymer;
an aqueous carrier fluid; and
a polymer composition comprising at least one of polyvinyl alcohol and polylactic acid;
wherein the treatment fluid has a viscosity at 140° F. and at a shear rate of about 0.1 s$^{-1}$ to about 1 s$^{-1}$ of about 1,500 cP to about 10,000 cP even when the aqueous carrier fluid comprises high total dissolved solids; and
placing the treatment fluid in a subterranean formation.

BRIEF DESCRIPTION OF THE FIGURES

The drawings illustrate generally, by way of example, but not by way of limitation, various embodiments discussed in the present document.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting. Further, information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to, but is not limited to, any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R)$_2$, SR, SOR, SO$_2$R', SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O) OR, N(R)C(O)R, N(R)C(S)R, N(R)C(O)N(R)$_2$, N(R)C(S)N (R)$_2$, N(COR)COR, N(OR)R, C(=NH)N(R)$_2$, C(O)N(OR) R, or C(=NOR)R, wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted; or wherein two R groups bonded to a nitrogen atom or to adjacent nitrogen atoms can together with the nitrogen atom or atoms form a heterocyclyl, which can be mono- or independently multi-substituted.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "alkyl" as used herein refers to straight chain and branched alkyl groups and cycloalkyl groups having from 1 to 30 carbon atoms, 1 to about 20 carbon atoms, 1 to 10 carbons, 1 to 8 carbon atoms 1 to 5 carbon atoms or, in some embodiments, from 1 to 3 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH═CH (CH$_3$), —CH═C(CH$_3$)$_2$, —C(CH$_3$)═CH$_2$, —C(CH$_3$)═CH(CH$_3$), —C(CH$_2$CH$_3$)═CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "heterocyclyl" as used herein refers to aromatic and non-aromatic ring compounds containing 3 or more ring members, of which, one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a $C_2$-heterocyclyl can be a 5-ring with two carbon atoms and three heteroatoms, a 6-ring with two carbon atoms and four heteroatoms and so forth. Likewise a $C_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The terms "halo," "halogen," or "halide" group, as used herein, by themselves or as part of another substituent, mean, unless otherwise stated, a fluorine, chlorine, bromine, or iodine atom.

As used herein, the term "salts" include, but are not limited to, any salt of a Group I (alkali metals) or Group II (alkaline earth metal) element, including salts of sodium, potassium, magnesium, calcium, strontium, and barium. Such salts include the bicarbonate, bromide, chloride, sulfate, nitrate, nitrite, and phosphate salts of Group I or Group II elements. The term "salts" also includes iron salts, including the sulfate and nitrate salts of iron. The term also includes aluminum salts (e.g., aluminum chloride and aluminum sulfate) and chromium salts (e.g., chromium sulfate and the like). In some specific embodiments, salts includes sodium chloride and potassium chloride.

As used herein, the term "high total dissolved solids" or "high TDS" broadly refers to total dissolved solids, including salts, ranging from about 20,000 mg/L to 250,000 mg/L, e.g., 50,000 mg/L to about 100,000 mg/L, from about 75,000 mg/L to about 150,000 mg/L, from about 100,000 mg/L to about 200,000 mg/L, from about 60,000 mg/L to about 150,000 mg/L or from about 50,000 to about 200,000 mg/L.

As used herein "flowback water" includes, but is not limited to the murky, salty water that is produced after fracturing a formation for hydrocarbon production. Flowback water can contain fracturing fluid, that returns to the surface, also known as fracturing load recovery, as well as produced water. In some instances, flowback water can contain clay, dirt, metal salts, chemicals, and diesel or other hydrocarbons that may have been added. Flowback water may have high TDS.

As used herein, the term "produced water" includes, but is not limited to naturally occurring water found in, among other places, sedimentary formations like shale, sandstone, and coal beds. Produced water may have high TDS.

The term "downhole" as used herein refers to under the surface of the earth, such as a location within or fluidly connected to a wellbore.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore; placing a material in a subterranean formation can include contacting the material with any section of a wellbore or with any subterranean region in fluid contact therewith. Subterranean materials can include any materials placed into the wellbore such as drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be an area desired to be fractured, a fracture or an area surrounding a fracture, a flow pathway or an area surrounding a flow pathway, wherein a fracture or a flow pathway can be optionally fluidly connected to a subterranean petroleum- or water-producing region, directly or through one or more fractures or flow pathways.

As used herein "treatment of a subterranean formation" can include any activity directed to extraction of water or petroleum materials from a subterranean petroleum- or water-producing formation or region, for example, including drilling, stimulation, hydraulic fracturing, clean-up, acidization, completion, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore, or vice-versa. A flow pathway can include at least one of a hydraulic fracture, a fluid connection across a screen, gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can sufficient to divert from a wellbore, fracture, or flow pathway connected thereto at least one of water, a downhole fluid, or a produced hydrocarbon.

Embodiments of the present invention relate to treatment fluids. More specifically, embodiments of the present invention relate to treatment fluids comprising, among other things, a viscosifier polymer and a polymer composition comprising at least one of polyvinyl alcohol and polylactic acid and methods of using the treatment fluids in subterranean formations penetrated by well bores. In some embodiments, the treatment fluids further comprise a suitable cross-linking agent. In other embodiments, the treatment fluids further comprise an aqueous carrier fluid comprising high TDS.

As used herein, the term "treatment fluids" refers generally to any fluid that may be used in a subterranean application in conjunction with a desired function and/or for a desired purpose. The term "treatment fluid" does not imply any particular action by the fluid or any component thereof. As a result, the present compositions can be inexpensive and simple to prepare, using either batch mixing or on-the-fly procedures. In some embodiments, the term "treatment fluids" includes, but is not limited to drilling fluids, stimulation fluids, clean-up fluids, fracturing fluids, spotting fluids, production fluids, completion fluids, remedial treatment fluids, abandonment fluids, acidizing fluids, water control materials, packing fluids or combinations thereof.

As used herein, the term "drilling fluid" refers to fluids, slurries, or muds used in drilling operations downhole, such as the formation of a wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations and can be any fluid designed for localized treatment of a downhole region. In one example, a spotting fluid can include a lost circulation material for treatment of a specific section of a wellbore, such as to seal off fractures in a wellbore and prevent sag. In another example, a spotting fluid can include a water control material. In some examples, a spotting fluid can be designed to free a stuck piece of drilling or extraction equipment; can reduce torque and drag with drilling lubricants; prevent differential sticking; promote wellbore stability; and can help to control mud weight.

As used herein, the term "production fluid" refers to fluids or slurries used downhole during the production phase of a well. Production fluids can include downhole treatments designed to maintain or increase the production rate of a well, such as perforation treatments, clean-up treatments or remedial treatments.

As used herein, the term "completion fluid" refers to fluids or slurries used downhole during the completion phase of a well.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments downhole. In one example, an acidizing fluid is used in a clean-up operation to remove material obstructing the flow of desired material, such as material formed during a perforation operation. In some examples, an acidizing fluid can be used for damage removal.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well, between tubing and outer casing above a packer. In various examples, the packer fluid can provide hydrostatic pressure in order to lower differential pressure across a sealing element; lower differential pressure on the wellbore and casing to prevent collapse; and protect metals and elastomers from corrosion.

One advantage of the treatment fluids of the present invention is that the fluids can be prepared with aqueous carrier fluids containing high TDS, including flowback water and produced water, without adversely impacting the viscosity of the treatment fluid. For example, in certain embodiments, the treatment fluid comprises a viscosifier polymer; an aqueous carrier fluid; and a polymer composition comprising at least one of polyvinyl alcohol and polylactic acid; wherein the treatment fluid has a viscosity at 140° F. and at a shear rate of about 0.1 s$^{-1}$ to about 1 s$^{-1}$ of about 1,500 cP to about 10,000 cP even when the aqueous carrier fluid comprises high total dissolved solids.

Another advantage is that the treatment fluids of the present invention are stable at temperatures of about 100° F. to about 200° F., about 100° F. to about 180° F., about 120° F. to about 160° F. or about 130° F. to about 150° F. for about 30 minutes to about 10 hours (e.g., about 30 minutes to about 5 hours, about 1 hour to about 5 hours or about 1 hour to about 10 hours) or more.

In general, the treatment fluids of the present invention comprise among other things, a viscosifier polymer and a polymer composition comprising at least one of polyvinyl alcohol and polylactic acid. The viscosifier polymer and/or the polymer composition comprising at least one of polyvinyl alcohol and polylactic acid can, in some embodiments, be formulated to comprise other components including, but not limited to, an aqueous carrier fluid. In certain embodiments, the polymer composition consists solely of polyvinyl alcohol, polylactic acid or combinations thereof and, optionally, an aqueous carrier fluid. In some embodiments, the treatment fluids further comprise a suitable crosslinking agent. In other embodiments, the treatment fluids further comprise an aqueous carrier fluid comprising high TDS.

The treatment fluids of the embodiments of the present invention comprise a suitable viscosifier polymer, where the viscosifier polymer is preferably a crosslinked or a crosslinkable viscosifier polymer. The viscosifier polymer is present at least to increase the viscosity of the treatment fluid. In some embodiments, the viscosifier polymer may be any suitable viscosifier polymer that can be crosslinked by a crosslinking agent; is compatible with the aqueous carrier fluid, including an aqueous carrier fluid comprising high TDS; and is compatible with a polymer composition comprising at least one of polyvinyl alcohol and polylactic acid.

Suitable viscosifier polymers may comprise galactomannan gums, including modified or derivatized galactomannan gums. Examples of such galactomannan gums include, but are not limited to guar gum, hydroxypropylguar, carboxymethylhydroxypropylguar (CMHPG), carboxymethylguar, and any combination thereof. Additional examples of viscosifier polymers which may be utilized in the present invention include but are not limited to cellulose, derivatized cellulose, and all water-soluble salts of carboxyalkyl cellulose ethers including, but not limited to, alkali metal salts (e.g., sodium and potassium), ammonium salts, aluminum salts, and zirconium salts. See, e.g., U.S. Pat. Nos. 3,064,313; 2,420,949; and 2,603,839, the entireties of all of which are incorporated by reference herein. Examples of cellulose and derivatized cellulose include carboxymethylcellulose, carboxymethylhydroxymethyl cellulose, carboxymethylhydroxyethyl cellulose, phosphonated cellulose, and any combination thereof, and any salts thereof. Viscosifier polymers also include other natural or synthetic polymers such as xanthan gum, diutan gum, alginates, carrageeenan, and other hydrocollides such as alginic acid, beta-glucan, chicle gum, dammar gum, gellan gum, guar gum, gum arabic, gum ghatti, gum tragacanth, karava gum, locust bean gum, mastic gum, psyllium seed husks, sodium alginate, spruce gum, tara gum, xanthan gum, hydroxypropyl guar, carboxymethyl hydroxypropyl guar, and any combinations thereof. Still other viscosifier polymers include polyacrylamides; hydrolyzed polyacrylamides; scleroglucan; polysaccharides; amphoteric polymers made from at least one of acrylamide, acrylic acid, and diallyldimethylammonium chloride; vinyl sulfonate/vinyl amide/acrylamide terpolymers; vinyl sulfonate/acrylamide copolymers; acrylamide/acrylamido-methylpropanesulfonic acid copolymers; acrylamide/vinylpyrrolidone copolymers; sodium carboxymethyl cellulose; poly[dialkylamino acrylate-co-acrylate-graftpoly (ethyleneoxide)]; acrylamide/octadecyldimethylammoniummethyl methacrylate bromide copolymer; dimethylaminoethyl; methacrylate/vinyl pyrrolidone/hexadecyldimethylammoniumethyl methacrylate bromide terpolymer; and acrylamide/2-acrylamido-2-methyl propane sulfonic acid/2-ethylhexyl methacrylate terpolymer. Other viscosifier polymers that are known in the art, but which are not specifically mentioned herein, can also be utilized.

The viscosifier polymer may be present in the treatment fluid in an amount in the range of from about 10 to about 100 lb/mgal, e.g., about 10 to about 50 lb/mgal, about 20 to about 50 lb/mgal, about 30 to about 50 lb/mgal or from about 30 to about 90 lb/mgal.

The treatment fluids of the present invention also comprise a polymer composition comprising at least one of polyvinyl alcohol (PVA) and polylactic acid (PLA). The treatment fluids of the present invention contain any suitable amount of PVA and PLA. In some embodiments, the treatment fluids contain about 0.5 pptg PLA to about 10 pptg PLA, about 1 pptg PLA to about 8 pptg PLA, about 2 pptg PLA to about 7 pptg PLA or about 3 pptg to about 6 pptg PLA. In some embodiments, the treatment fluids contain about 0.5 pptg PVA to about 10 pptg PVA, about 1 pptg PVA to about 8 pptg PVA, about 2 pptg PVA to about 7 pptg PVA or about 3 pptg PVA to about 6 pptg PVA. In some embodiments, combinations of PVA and PLA are contemplated in any suitable ratio of PVA to PLA.

As used herein, the term "polyvinyl alcohol" broadly refers to polyvinyl alcohol homo polymers as well as polyvinyl alcohol copolymer or a crosslinked polyvinyl alcohol copolymer including at least one of graft, linear, branched, block, and random polyvinyl copolymers. In some embodiments, the term "polyvinyl alcohol" broadly refers to compounds comprising repeating units having the structure:

wherein $R_1$ is hydrogen or a $C_1$-$C_{30}$ hydrocarbyl group (e.g., $C_1$-$C_{10}$ hydrocarbyl, $C_1$-$C_5$ hydrocarbyl, and $C_1$-$C_3$ hydrocarbyl); and n is an integer from about 5 to about 10,000 (e.g., about 5 to about 1,000, about 250 to about 2,500, about 1,000 to about 5,000, about 1,000 to about 2,500, about 1,000 to about 1,800, and about 1,500 to about 2,000). In some embodiments, $R_1$ is hydrogen.

Those of skill in the art will recognize that polyvinyl alcohol is synthesized from a monomer that, subsequent to polymerization, is hydrolyzed to give polyvinyl alcohols having varying levels of hydrolysis. The term polyvinyl alcohol, as used herein, also broadly refers to compounds comprising repeating units having the structure:

wherein $R_1$ and n are as defined above; $R_3$ represents a hydrolyzable group; and q is chosen such that the level of hydrolysis of the polyvinyl alcohol is about 80% or more, e.g., about 85% or more, about 90% or more, about 95% or more, about 99% or more, or about 100%; from about 80% to about 100%, about 80% to about 99%, about 80% to about 95%, about 90% to about 100% or about 85% to about 100%. Examples of hydrolyzable groups represented by $R_3$ include, but are not limited to, acyl groups. Representative acyl groups include, acetyl and benzoyl.

As used herein, the term "polyvinyl alcohol" also broadly refers to compounds of the formulae:

wherein $R_1$, $R_3$, n, and q are as defined above and $G_1$ and $G_2$ are each, independently, a suitable end-capping group such as —H, —OH, $C_1$-$C_8$ hydrocarbyl, and the like.

In some embodiments, the polyvinyl alcohol, regardless of the level of hydrolysis, has a molecular weight of about 500 g/mol to about 200,000 g/mol (e.g., about 500 g/mol to about 50,000 g/mol, 20,000 g/mol to about 100,000 g/mol, about 80,000 g/mol to about 150,000 g/mol, about 80,000 g/mol to about 100,000 g/mol, and about 90,000 g/mol to about 120,000 g/mol).

As used herein, the term "polylactic acid" broadly refers to polylactic acid homo polymers as well as polylactic acid copolymers (e.g., block and random). As used herein, the term "polylactic acid" also broadly refers to compounds comprising repeating units having the structure:

wherein $R_2$ is hydrogen or a $C_1$-$C_{30}$ hydrocarbyl group (e.g., $C_1$-$C_{10}$ hydrocarbyl, $C_1$-$C_5$ hydrocarbyl, and $C_1$-$C_3$ hydrocarbyl); and p is an integer from about 5 to about 7,000 (e.g., about 5 to about 2,500, about 100 to about 1,000, about 800 to about 5,000, about 1,000 to about 3,500, about 600 to about 1,800, and about 1,000 to about 2,000). In some embodiments, $R_2$ is a $C_1$-$C_{30}$ hydrocarbyl group. In other embodiments, $R_2$ is a $C_1$-$C_5$ hydrocarbyl group. In some embodiments, $R_2$ is a $C_1$-$C_5$ alkyl group. In still other embodiments, $R_2$ is methyl. In some embodiments, the polylactic acid has a molecular weight of about 1,000 g/mol to about 200,000 g/mol (e.g., about 1,000 g/mol to about 80,000 g/mol, about 1,000 g/mol to about 50,000 g/mol, about 80,000 g/mol to about 150,000 g/mol, about 80,000 g/mol to about 100,000 g/mol, and about 90,000 g/mol to about 120,000 g/mol).

As used herein, the term "polylactic acid" also broadly refers to compounds of the formula:

wherein $R_2$ and n are as defined above and $G_3$ and $G_4$ are each, independently, a suitable end-capping group such as —H, —OH, $C_1$-$C_8$ hydrocarbyl, and the like.

The aqueous carrier fluid, which in some embodiments comprises high TDS, is generally present in the treatment fluid of various embodiments of the present invention in at least an amount sufficient to partially or fully hydrate the viscosifier polymer. In certain embodiments of the present invention, once the viscosifier polymer is partially or fully hydrated, the pH may be adjusted to increase the alkalinity to from about 7.5 to about 9 or higher.

The aqueous carrier fluid used in the treatment fluids of the embodiments of the present invention comprises one or more aqueous fluids. For example, the aqueous carrier fluid may include, but is not limited to including, fresh water, salt-fortified fresh water, sea water, salt-fortified sea water, heavy brine solutions, produced water, flowback water, weighted brine (e.g., an aqueous solution of sodium bromide, calcium bromide, zinc bromide and the like), or any combination thereof. Generally, the aqueous fluid may be from any source, provided that it does not contain components that might adversely affect the stability and/or performance of the treatment fluids of the embodiments of the present invention. In certain embodiments, the density of the aqueous carrier fluid can be increased, among other purposes, to provide additional particle transport and suspension in the treatment fluids of the embodiments of the present invention.

In certain embodiments, the pH of the aqueous carrier fluid may be adjusted (e.g., by a buffer or other pH adjusting agent) with any suitable pH adjusting agent prior to, during or after the preparation of the treatment fluids to, among other things, further facilitate hydration of the viscosifier polymer; to activate a crosslinking agent, when present; and/or to reduce the viscosity of the treatment fluid (e.g., by activating a breaker and deactivating a crosslinking agent). The pH may be adjusted to a specific level, which may depend on, among other factors, the types of viscosifier polymers, compositions comprising at least one of PVA and PLA, and/or crosslinking agents (when present) in the treatment fluid. In general, the pH of the fluid may be about 10 or less (e.g., from about 7.5 to about 10, from about 8.5 to about 9.5, from about 8 to about 9, from about 8.5 to 10 or from about 9 to about 10).

Suitable pH adjusting agents include any compounds capable of altering the pH of the treatment fluid. Examples of such compounds that may be used include, but are not limited to, formic acid, acetic acid, acetic anhydride, sodium hydroxide, potassium hydroxide, various carbonates (e.g., sodium bicarbonate), any combination thereof, or any other commonly used pH control agent that does not adversely react with the viscosifier polymer, crosslinking agent or the at least one polymer comprising one or more ortho-dioxy arylene units to prevent its use in accordance with the method of the present invention. When used, the pH-adjusting compound is generally present in a treatment concentrate of the present invention in an amount in the range of from about 0.5% to about 10% by weight of the aqueous fluid therein. In another embodiment, the pH-adjusting compound is generally present in a treatment fluid of the present invention in an amount in the range of from about 0.01% to about 0.3% by weight of the aqueous fluid therein. In an embodiment, the pH adjusting agent comprises sodium hydroxide and is present in an amount from about 0.01 gallons per thousand gallons of treatment fluid ("gpt") to about 2 gpt. One of ordinary skill in the art, with the benefit of this disclosure, will recognize if/when such pH adjustments are appropriate.

In some embodiments, the treatment fluids of the present invention also comprise a suitable crosslinking agent. The term "crosslinking agent" is defined herein to include any molecule, atom, or ion that is capable of forming one or more crosslinks between molecules of the viscosifier polymer. The crosslinker can be any suitable crosslinker. In various embodiments, the crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a $(C_1-C_{30})$hydrocarbylboronic acid, a $(C_1-C_{30})$hydrocarbyl ester of a $(C_1-C_{30})$hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate.

The treatment fluid of various embodiments of the present invention can include any suitable amount of the crosslinker, such as about 0.1 g/mgal to about 100 g/mgal, about 0.1 g/mgal to about 25 g/mgal, about 0.1 g/mgal to about 10 g/mgal, about 0.5 g/mgal to about 5 g/mgal, about 0.5 g/mgal to about 2.5 g/mgal or about 0.5 g/mgal to about 1.5 g/mgal. One with ordinary skill in the art, with the benefit of this disclosure, will recognize the appropriate type and amount of crosslinking agent to include in a treatment fluid of the present invention based on, among other things, the temperature conditions of a particular application; the type of viscosifier polymer used; the molecular weight of the viscosifier polymer; the type of composition comprising at least one of PVA and PLA; the degree of rheological modification desired; and/or the pH of the treatment fluid.

The crosslinking agent utilized in the present invention may be capable of causing delayed crosslinking of the viscosifier polymer for pipe transit times greater than 5 minutes. Thus, the delay in crosslinking exhibited by compositions of the present invention may be about 5 minutes or more. A delayed release may be desirable when a subterranean operation involves high temperature conditions, and in a deep well or in a well requiring a long pump time. In some embodiments, the crosslinking agent may be capable of causing an accelerated crosslinking of the viscosifier polymer. Such acceleration may be desirable due to the conditions of the treatment fluid and the expected conditions within the subterranean formation. For example, the temperature of the formation may make it desirable to include an accelerated crosslinking agent in the treatment fluid. Suitable accelerated crosslinking agents may include, but are not limited to, instant borate, instant zirconium, instant titanium or any combination thereof.

The viscosifier polymers, compositions comprising at least one of PVA and PLA, and crosslinking agents (when present), or any component of the treatment fluids of the various embodiments of the present invention, may be provided or used in any suitable form. For instance, any component of the treatment fluids of the various embodiments of the present invention may be a liquid, a gel, an emulsion, or a solid. In some embodiments, a component may be dissolved, suspended, or emulsified in a liquid.

In some embodiments, the treatment fluids of the present invention may comprise particulates, such as proppant particulates, gravel particulates or pre-cured-resin-coated proppant particulates. Particulates suitable for use in the present invention may comprise any material suitable for use in subterranean operations. Suitable materials for these particulates include, but are not limited to, sand, bauxite, ceramic materials, glass materials, polymer materials, Teflon® materials, nut shell pieces, cured resinous particulates comprising nut shell pieces, seed shell pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The particulate size generally may range from about 2 mesh to about 400 mesh or smaller on the U.S. Sieve Series; however, in certain circumstances, other sizes may be desired and will be entirely suitable for practice of the present invention. In particular embodiments, preferred particulates size distribution ranges are one or more of 6/12, 8/16, 12/20, 16/30, 20/40, 30/50, 40/60, 40/70, or 50/70 mesh. Also, mixtures of particulates may be used having different particle size distribution ranges to enhance the packed volume of the proppant particulates within a fracture. See, e.g., Published U.S. Appl. No. 2013/0220619. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In certain embodiments, the particulates included in the treatment fluids of the present invention may be coated with any suitable resin or tackifying agent known to those of ordinary skill in the art. In certain embodiments, the particulates may be present in the treatment fluids of the present invention in an amount in the range of from about 0.5 pounds per gallon ("ppg") to about 30 ppg by volume of the treatment fluid.

The treatment fluid of the embodiments of the present invention can also comprise a gel breaker which "breaks" or diminishes the viscosity of the fracturing fluid so that it is more easily recovered from the fracture during clean up. Examples of gel breakers suitable for use with the treatment fluids of the embodiments of the present invention include oxidizing agents, enzymes, acids, and any combination thereof, with oxidizing agents being the most preferred. In an embodiment, the gel breaker may comprise a delayed gel breaker. Examples of delayed gel breakers that may be used include, but are not limited to, various lactones, esters, encapsulated acids and slowly soluble acid generating compounds, oxidizers which produce acids upon reaction with water (such as polyesters or polyorthoesters), water reactive metals such as aluminum, lithium and magnesium and the like. In certain embodiments, the delayed gel breaker is an ester. Where used, the gel breaker is generally present in the treating fluid in an amount in the range of from about 0.01% to about 10% by weight of the aqueous fluid therein. Alternatively, any of the conventionally used delayed breakers employed with metal ion crosslinkers may be used, for example, oxidizers such as sodium chlorite, sodium hypochlorite, sodium bromate, sodium persulfate, ammonium persulfate, encapsulated sodium persulfate, potassium persulfate, or ammonium persulfate and the like as well as magnesium peroxide. Enzyme breakers that may be employed include alpha and beta amylases, amyloglucosidase, invertase, and maltase. The specific breaker or delinker used, whether or not it is encapsulated, as well as the amount thereof employed will depend upon the breaking time desired; the nature of the viscosifier polymer, crosslinking agent, and/or the at least one polymer comprising one or more ortho-dioxy arylene units; formation characteristics and conditions; and other factors.

The treatment fluids of the embodiments of the present invention may include one or more of a variety of well-known additives which do not adversely react with the treatment fluids. Examples of additives include, but are not limited to, gel stabilizers (e.g., Gel-Sta™ from Halliburton), fluid loss control additives, clay stabilizers, biocides, bactericides, friction reducers, gas, surfactants, solubilizers, pH adjusting agents, salts (e.g., potassium chloride), smart polymers (e.g., thermoresponsive and pH sensitive polymers) and the like. For example, in some embodiments, it may be desired to foam a treatment fluid of the embodiments of the present invention using a gas, such as air, nitrogen, or carbon dioxide. The treatment fluids of the embodiments of the present invention may also include one or more of a variety of other well-known additives including, but not limited to, an aqueous base, oil, organic solvent, synthetic fluid oil phase, alcohol or polyol, starch, density control agent, density modifier, emulsifier, dispersant, polymeric stabilizer, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, weight reducing additive, heavy-weight additive, lost circulation material, filtration control additive, fibers, thixotropic additive, breaker, rheology modifier, curing accelerator, curing retarder, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, a hydratable clay, microspheres, pozzolan lime, or a combination thereof. Those of ordinary skill in the art, with the benefit of this disclosure, will be able to determine the appropriate additives for a particular application.

The treatment fluids of the embodiments of the present invention can be prepared by dissolving one or more of the components (e.g., a viscosifier polymer that is crosslinked or uncrosslinked, a polymer composition comprising at least one of polyvinyl alcohol and polylactic acid; and a crosslinking agent) in an aqueous fluid (e.g., seawater; produced water; and/or flowback water); combining one or more of the components in solid or liquid form, then adding an aqueous fluid; or dissolving one or more of the components, separately, and adding, to the solution, one or more of the other components in solid or liquid form.

The order in which the components are added, whether as a solution or in solid form, is not limiting. In some examples, a viscosifier polymer in an aqueous carrier fluid is prepared first to form a viscosifier polymer composition. The polymer composition comprising at least one of polyvinyl alcohol and polylactic acid can be combined with the viscosifier polymer composition. The composition comprising the viscosifier polymer and the polymer composition comprising at least one of polyvinyl alcohol and polylactic acid can then be combined with the crosslinking agent. Those of ordinary skill in the art will recognize that the crosslinking agent can cause the crosslinking of the viscosifier polymer to give a crosslinked viscosifier polymer.

In other examples, a viscosifier polymer in an aqueous carrier fluid is prepared first to form a viscosifier polymer composition. The crosslinking agent can be combined with the viscosifier polymer composition. The composition comprising the viscosifier polymer and the crosslinking agent can then be combined with the polymer composition comprising at least one of polyvinyl alcohol and polylactic acid.

The viscosifier polymer can be used as either a solid or a liquid gel concentrate in a pre-hydrated or slurried form using conventional mixing and pumping equipment. The polymer composition comprising at least one of polyvinyl alcohol and polylactic acid can also be added to the aqueous carrier fluid as either a solid, liquid or a liquid concentrate using conventional mixing and pumping equipment. As is understood by those skilled in the art, in some embodiments, the crosslinker may be pumped and metered into the viscosifier polymer composition (e.g., the viscosifier polymer or viscosifier polymer composition alone or comprising the viscosifier polymer or viscosifier polymer composition and a polymer composition comprising at least one of polyvinyl alcohol and polylactic acid), as the viscosifier polymer composition is pumped into the well bore. Additional components may be added into the treatment fluid with the viscosifier polymer or viscosifier polymer composition or on the fly as the viscosifier polymer or viscosifier polymer composition is pumped into the well bore.

In an embodiment, a method of using the treatment fluid of the embodiments of the present invention comprises obtaining or providing a treatment fluid comprising a viscosifier polymer; an aqueous carrier fluid comprising high total dissolved solids; and a polymer composition comprising at least one of polyvinyl alcohol and polylactic acid; and placing the treatment fluid in a subterranean formation. In some embodiments, the method is a method of drilling the subterranean formation.

The treatment fluid of the embodiments of the present invention may be used for any treatment or subterranean operation known to one of ordinary skill in the art. In some embodiments, the treatment fluid has a viscosity at 140° C. and at a shear rate of about $0.1\ s^{-1}$ to about $1,000\ s^{-1}$ (e.g., about $0.1\ s^{-1}$ to about $500\ s^{-1}$, about $0.1\ s^{-1}$ to about $100\ s^{-1}$, about $0.1\ s^{-1}$ to about $10\ s^{-1}$ or about $0.1\ s^{-1}$ to about $1\ s^{-1}$) of about 30 cP to about 10,000 cP, about 100 cP to about 2,000 cP, about 200 to about 3,500 cP, about 1,500 cP to about 10,000 cP, about 2,000 cP to about 5,000 cP, about 1,500 cP to about 5,000 cP, about 2,000 cP to about 3,500 cP or about 2,000 cP to about 3,000 cP.

In some embodiments, the obtaining or providing of the composition occurs above-surface. In other embodiments, the obtaining or providing of the composition occurs downhole. In still other embodiments, the obtaining or providing comprises mixing the viscosifier polymer in the aqueous carrier fluid to obtain a first mixture and mixing the first mixture with the polymer composition comprising at least one of polyvinyl alcohol and polylactic acid. The mixing of the first mixture and the polymer composition can occur above surface, downhole or anywhere in between.

In an embodiment, the treatment fluid of the embodiments of the present invention is a fracturing fluid. Thus, the present invention provides for a method of fracturing a subterranean formation comprising the steps of (a) preparing a treatment fluid comprising a viscosifier polymer; an aqueous carrier fluid comprising high total dissolved solids; a polymer composition comprising at least one of polyvinyl alcohol and polylactic acid; and, in some embodiments, a crosslinking agent; (b) introducing the treatment fluid into a subterranean formation at a rate and pressure whereby fractures are formed in the subterranean formation; and (c) optionally introducing proppant into the newly created fractures at a rate and pressure whereby the fractures are propped open during the producing life of the subterranean formation. In some embodiments, the subterranean formation is penetrated by a well bore.

In various embodiments, the present invention provides a system. The system can be any suitable system that can use or that can be generated by use of the treatment fluid described herein, or that can perform or be generated by performance of a method for using the treatment fluid described herein. The system can include a composition including the treatment fluid. The system can also include a subterranean formation including the treatment fluid therein. In some embodiments, the treatment fluid in the system can also include a proppant.

In some embodiments, the present invention provides a system comprising a treatment fluid comprising a viscosifier polymer; an aqueous carrier fluid comprising high total dissolved solids; and a polymer composition comprising at least one of polyvinyl alcohol and polylactic acid; and, in some embodiments, a crosslinking agent; and a subterranean formation comprising the treatment fluid therein. The system can further comprise a drillstring disposed in a wellbore, the drillstring comprising a drill bit at a downhole end of the drillstring; an annulus between the drillstring and the wellbore; and a pump configured to circulate the treatment fluid through the drill string, through the drill bit, and back above-surface through the annulus. The system can also further comprise a fluid processing unit configured to process the composition exiting the annulus to generate a cleaned composition for recirculation through the wellbore.

In some embodiments, the system can include a tubular disposed in a wellbore. The system can include a pump configured to pump the composition downhole through the tubular and into the subterranean formation.

The treatment fluids disclosed herein may directly or indirectly affect one or more components or pieces of equipment associated with the preparation, delivery, recapture, recycling, reuse, and/or disposal of the disclosed treatment fluids. For example, and with reference to FIG. 1, the disclosed treatment fluid may directly or indirectly affect one or more components or pieces of equipment associated with a wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

Figure 1:
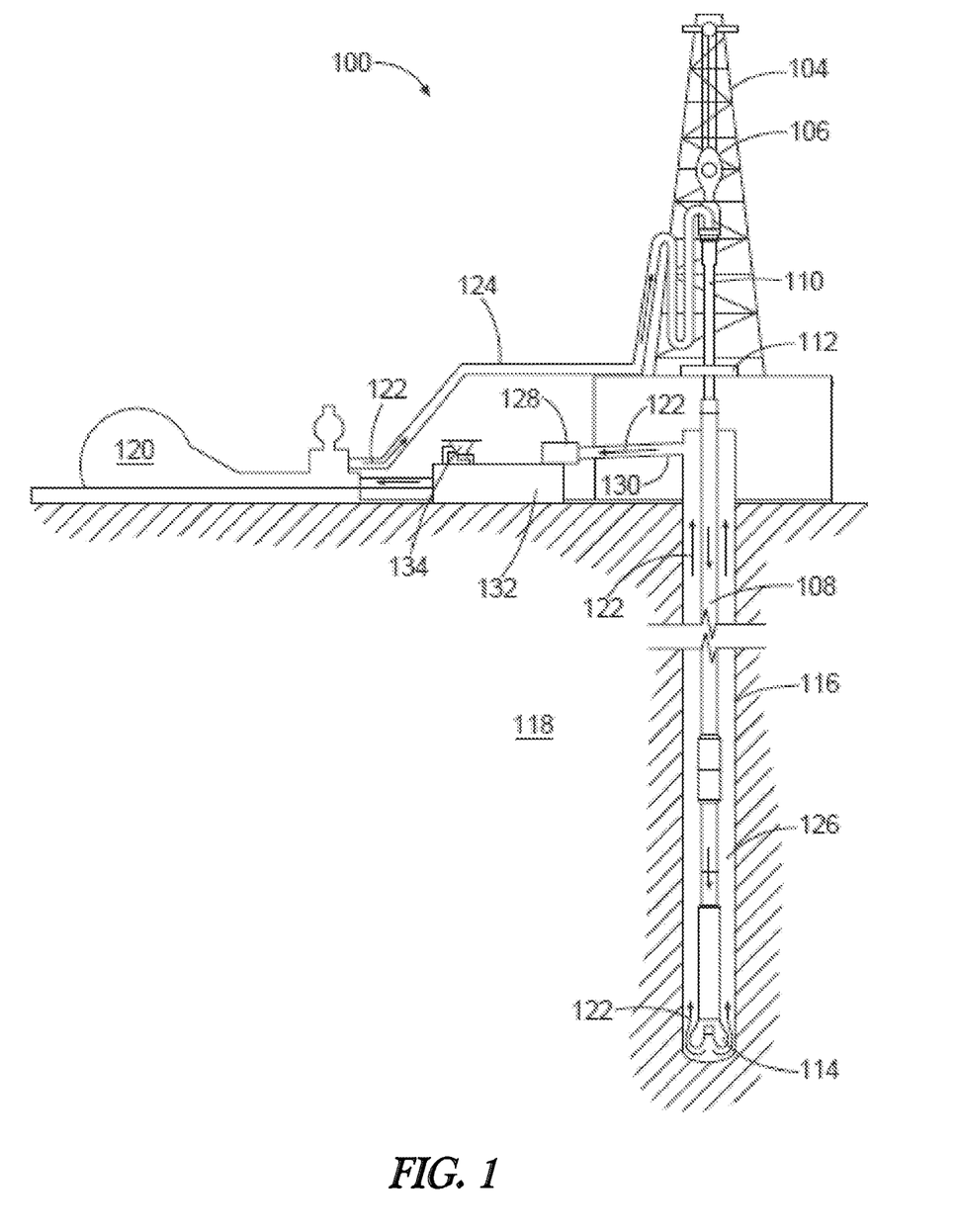
FIG. 1 illustrates a drilling assembly, in accordance with various embodiments.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates treatment fluid 122 through a feed pipe 124 and to the kelly 110, which conveys the treatment fluid 122 downhole through the interior of the drill string 108 and through one or more orifices in the drill bit 114. The treatment fluid 122 is then circulated back to the surface via an annulus 126 defined between the drill string 108 and the walls of the wellbore 116. At the surface, the recirculated or spent treatment fluid 122 exits the annulus 126 and may be conveyed to one or more fluid processing unit(s) 128 via an interconnecting flow line 130. After passing through the fluid processing unit(s) 128, a "cleaned" treatment fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

The components of the treatment fluid 122 may be added via a mixing hopper 134 communicably coupled to or otherwise in fluid communication with the retention pit 132. The mixing hopper 134 may include, but is not limited to, mixers and related mixing equipment known to those skilled in the art. The retention pit 132 may be representative of one or more fluid storage facilities and/or units where the treatment fluid may be stored, reconditioned, and/or regulated.

As mentioned above, the treatment fluid may directly or indirectly affect the components and equipment of the drilling assembly 100. For example, the treatment fluid may directly or indirectly affect the fluid processing unit(s) 128, which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used to store, monitor, regulate, and/or recondition the treatment fluid.

The treatment fluid can directly or indirectly affect the pump 120, which representatively includes any conduits, pipelines, trucks, tubulars, and/or pipes used to fluidically convey the treatment fluid downhole, any pumps, compressors, or motors (e.g., topside or downhole) used to drive the composition into motion, any valves or related joints used to regulate the pressure or flow rate of the treatment fluid, and any sensors (e.g., pressure, temperature, flow rate, and the like), gauges, and/or combinations thereof, and the like. The treatment fluid can also directly or indirectly affect the mixing hopper 134 and the retention pit 132 and their assorted variations.

The treatment fluid can also directly or indirectly affect the various downhole equipment and tools that may come into contact with the treatment fluid such as, but not limited to, the drill string 108, any floats, drill collars, mud motors, downhole motors, and/or pumps associated with the drill string 108, and any measurement while drilling (MWD)/ logging while drilling (LWD) tools and related telemetry equipment, sensors, or distributed sensors associated with the drill string 108. The treatment fluid can also directly or indirectly affect any downhole heat exchangers, valves and corresponding actuation devices, tool seals, packers and other wellbore isolation devices or components, and the like associated with the wellbore 116. The treatment fluid can also directly or indirectly affect the drill bit 114, which may include, but is not limited to, roller cone bits, polycrystalline diamond compact (PDC) bits, natural diamond bits, any hole openers, reamers, coring bits, and the like.

While not specifically illustrated herein, the treatment fluid can also directly or indirectly affect any transport or delivery equipment used to convey the treatment fluid to the drilling assembly 100 such as, for example, any transport vessels, conduits, pipelines, trucks, tubulars, and/or pipes used to fluidically move the treatment fluid from one location to another, any pumps, compressors, or motors used to drive the composition into motion, any valves or related joints used to regulate the pressure or flow rate of the composition, and any sensors (e.g., pressure and temperature), gauges, and/or combinations thereof, and the like.

In various embodiments, the present invention provides an apparatus. The apparatus can be any suitable apparatus that can use or that can be generated by use of the treatment fluid described herein in a subterranean formation, or that can perform or be generated by performance of a method for using the treatment fluid described herein.

Various embodiments provide systems and apparatus configured for delivering the treatment fluid described herein to a downhole location and for using the treatment fluid therein. In various embodiments, the systems can include a pump fluidly coupled to a tubular (e.g., any suitable type of oilfield pipe, such as pipeline, drill pipe, production tubing, and the like), the tubular containing a treatment fluid described herein.

The pump can be a high pressure pump in some embodiments. As used herein, the term "high pressure pump" will refer to a pump that is capable of delivering a fluid downhole at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include, but are not limited to, floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the treatment fluid to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the treatment fluid is formulated. In various embodiments, the pump (e.g., a low pressure pump, a high pressure pump, or a combination thereof) can convey the treatment fluid from the mixing tank or other source of the treatment fluid to the tubular. In other embodiments, however, the composition can be formulated offsite and transported to a worksite, in which case the treatment fluid can be introduced to the tubular via the pump directly from its shipping container (e.g., a truck, a railcar, a barge, or the like) or from a transport pipeline. In either case, the treatment fluid can be drawn into the pump, elevated to an appropriate pressure, and then introduced into the tubular for delivery downhole.

Figure 2:
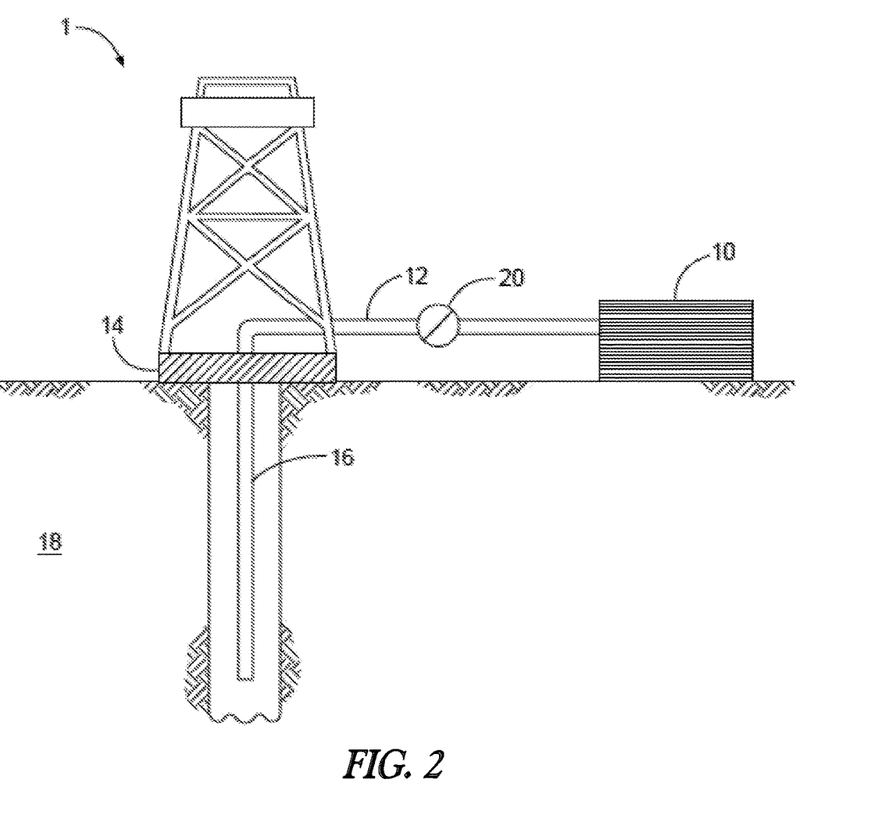
FIG. 2 illustrates a system or apparatus for delivering a composition downhole, in accordance with various embodiments.

FIG. 2 shows an illustrative schematic of systems and apparatuses that can deliver treatment fluids of the present invention to a downhole location, according to one or more embodiments. It should be noted that while FIG. 2 generally depicts a land-based system or apparatus, it is to be recognized that like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the treatment fluid can be formulated. The treatment fluid can be conveyed via line 12 to wellhead 14, where the treatment fluid enters tubular 16, with tubular 16 extending from wellhead 14 into subterranean. Upon being ejected from tubular 16, the treatment fluid can subsequently penetrate into subterranean formation 18. Pump 20 can be configured to raise the pressure of the treatment fluid to a desired degree before its introduction into tubular 16. It is to be recognized that system or apparatus 1 is merely exemplary in nature and various additional components can be present that have not necessarily been depicted in FIG. 2 in the interest of clarity. Non-limiting additional components that can be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the treatment fluid can, in some embodiments, flow back to wellhead 14 and exit subterranean formation 18. In some embodiments, the treatment fluid that has flowed back to wellhead 14 can subsequently be recovered, and in some examples reformulated, and recirculated to subterranean formation 18.

It is also to be recognized that the disclosed treatment fluid can also directly or indirectly affect the various downhole equipment and tools that can come into contact with the treatment fluid during operation. Such equipment and tools can include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

Various embodiments provide a composition for treatment of a subterranean formation. The composition can be any suitable composition that can be used to perform an embodiment of the method for treatment of a subterranean formation described herein. For example, the composition can include an embodiment of the treatment fluid described herein.

In various embodiments, the present invention provides a method for preparing a treatment fluid for treatment of a subterranean formation. The method can be any suitable method that produces a composition described herein. For example, the method can include forming a composition including an embodiment of the treatment fluid described herein.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

EXAMPLES

The present invention can be better understood by reference to the following examples which are offered by way of illustration. The present invention is not limited to the examples given herein.

Example 1

Tests were performed using a TA Instruments model "ARES™ Model G2" rheometer with a 27 mL din bob and 30 mm Samples were prepared with water saturated with 41 g synthetic sea salt and 3% KCl. For a control sample, the viscosifier polymer carboxymethylhydroxyethyl cellulose (CMHEC; 40 lb/mgal) was hydrated in salt water, followed by addition of crosslinker CL-41 (1 g/mgal).

Figure 3:
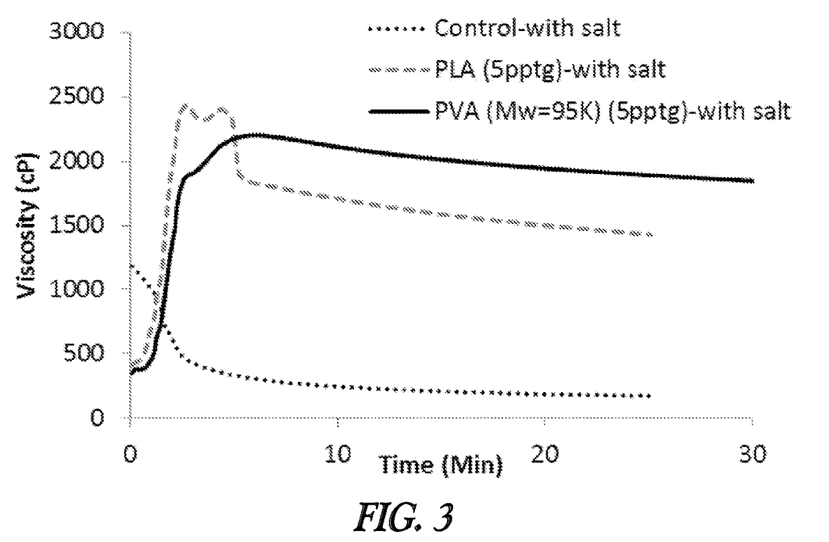
FIG. 3 is a plot of viscosity (cP) at 140° F. versus time for a control sample; a treatment fluid in accordance with various embodiments containing a viscosifying agent, polylactic acid, and a crosslinker; and a treatment fluid in accordance with various embodiments containing a viscosifying agent, polyvinyl alcohol, and a crosslinker. All of the samples were prepared to contain added salt(s).

In a second set of experiments, treatment fluids were prepared by adding polyvinyl alcohol (PVA; MW=95,000 g/mol; 5 pptg) or polylactic acid (PLA; 5 pptg) to viscosifier polymer (CMHEC) pre-hydrated in salt water, followed by addition of crosslinker. FIG. 3 is a plot of viscosity (cP) at 140° F. versus time for a control sample prepared as described above; a treatment fluid containing the viscosifying agent CMHEC, PLA, and crosslinker CL-41; and a treatment fluid containing the viscosifying agent CMHEC, PVA, and crosslinker CL-41. FIG. 3 shows that a significantly higher gel viscosity was observed in the samples that contained PVA or PLA. In other words viscosity of treatment fluid can be maintained by addition of PVA/PLA when high TDS water is used.

Example 2

Figure 4:
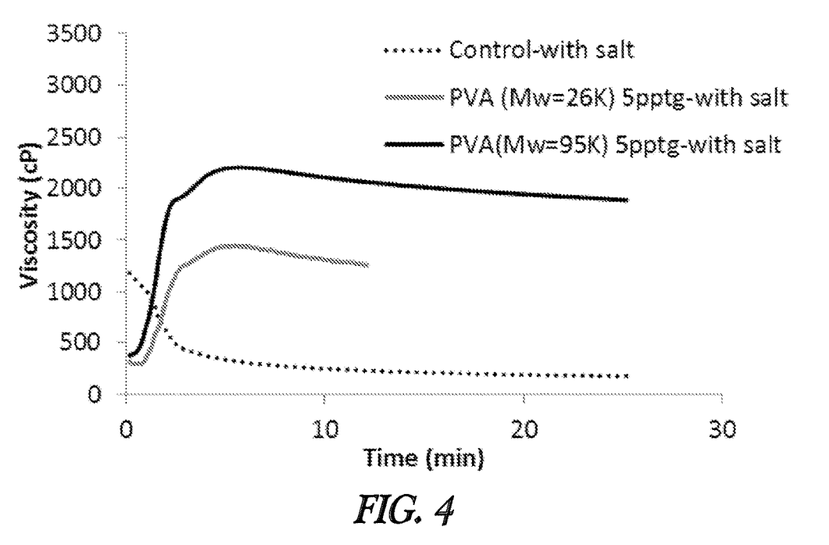
FIG. 4 is a plot of viscosity (cP) at 140° F. versus time for a control sample; a treatment fluid in accordance with various embodiments, containing a viscosifying agent, polyvinyl alcohol having a lower molecular weight, and a crosslinker; and a treatment fluid in accordance with various embodiments containing a viscosifying agent, polyvinyl alcohol having a molecular weight of about 95,000 g/mol, and a crosslinker.

A study was conducted to determine if a correlation exists between the increased viscosity of treatment fluids in the presence of added salt and the molecular weight of the PVA. Treatment fluids were prepared as described in Example 1, except that PVA (MW=26,000 g/mol, 5 pptg), which is partially hydrolysed (85%) and has a relatively low viscosity (5-6 cP, 4% solution), was used to prepare a treatment fluid. Another treatment fluid was prepared using higher molecular weight PVA (hydrolysis=95%, MW=95,000 g/mol). FIG. 4 shows that the treatment fluid prepared with Elvanol showed significantly lower viscosity relative to the higher molecular weight PVA.

Example 3: Omission of Salt

In a third set of experiment fluids were prepared without any salt. A treatment fluid was prepared containing the viscosifying agent CMHEC, PVA (MW=95,000 g/mol, 5 pptg), and crosslinker CL-41 (1 g/mgal), but otherwise lacking the presence of any added salt. Another treatment fluid was prepared containing the viscosifying agent CMHEC, PVA (MW=26,000 g/mol, 5 pptg), and crosslinker CL-41, but otherwise lacking the presence of any added salt.

Figure 5:
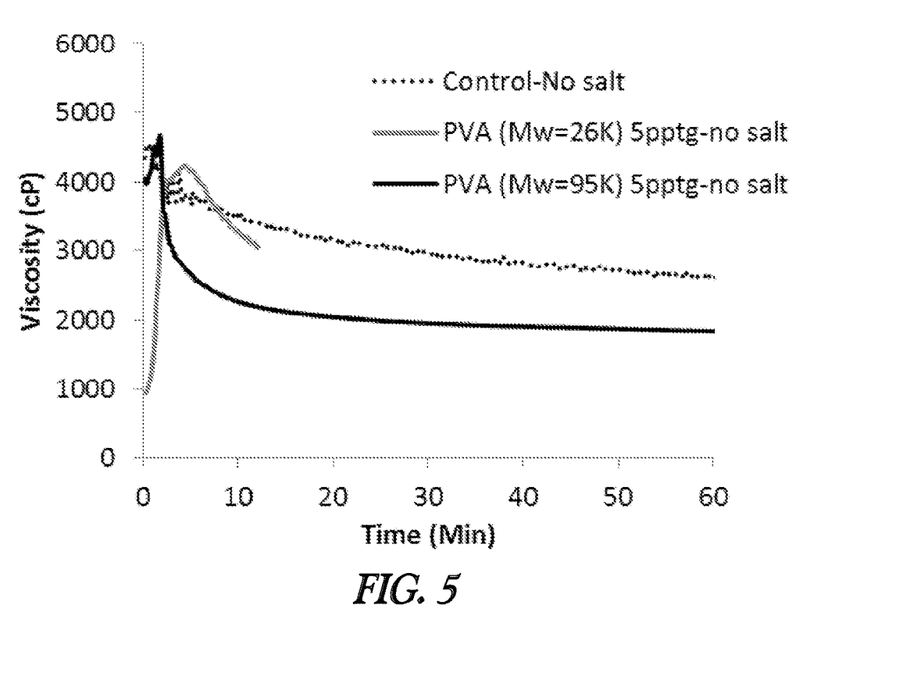
FIG. 5 is a plot of viscosity (cP) at 140° F. versus time for a control sample and for compositions lacking added salt(s).

FIG. 5 shows that when salt is omitted from the treatment fluid, the viscosities at 140° F. of the control-no salt (CM-HEC with CL-41) and the PVA-containing treatment fluid are comparable.

The present invention provides for the following exemplary embodiments, the numbering of which is not to be construed as designating levels of importance:

Embodiment 1 relates to a method comprising obtaining or providing a treatment fluid comprising a viscosifier polymer; an aqueous carrier fluid comprising high total dissolved solids; and a polymer composition comprising at least one of polyvinyl alcohol and polylactic acid; wherein the treatment fluid has a viscosity at 140° F. and at a shear rate of about 0.1 s$^{-1}$ to about 1000 s$^{-1}$ of about 30 cP to about 10,000 cP; and placing the treatment fluid in a subterranean formation.

Embodiment 2 relates to the method of Embodiment 1, wherein the obtaining or providing of the composition occurs above-surface.

Embodiment 3 relates to the method of Embodiment 1, wherein the obtaining or providing of the composition occurs downhole.

Embodiment 4 relates to the method of Embodiments 1-3, wherein the method is a method of drilling the subterranean formation.

Embodiment 5 relates to the method of Embodiments 1-4, wherein the obtaining or providing comprises mixing the viscosifier polymer in the aqueous carrier fluid to obtain a first mixture and mixing the first mixture with the polymer composition.

Embodiment 6 relates to the method of Embodiment 5, wherein the mixing of the first mixture and the polymer composition occurs above surface.

Embodiment 7 relates to the method of Embodiment 5, wherein the mixing of the first mixture and the polymer composition occurs downhole.

Embodiment 8 relates to the method of Embodiments 1-7, wherein polymer composition comprises an aqueous carrier fluid comprising high total dissolved solids.

Embodiment 9 relates to the method of Embodiments 1-8, wherein the polyvinyl alcohol comprises a polyvinyl alcohol homopolymer.

Embodiment 10 relates to the method of Embodiments 1-9, wherein the polyvinyl alcohol is about 80% to about 100% hydrolyzed.

Embodiment 11 relates to the method of Embodiments 1-10, wherein the polyvinyl alcohol comprises a structure of the formula:

wherein R$_1$ is hydrogen or a C$_1$-C$_{30}$ hydrocarbyl group; and n is an integer from about 1,000 to about 10,000.

Embodiment 12 relates to the method of Embodiment 11, wherein R$_1$ is hydrogen.

Embodiment 13 relates to the method of Embodiments 1-12, wherein the polylactic acid comprises a polylactic acid homopolymer.

Embodiment 14 relates to the method of Embodiments 1-13, wherein the polylactic acid comprises a structure of the formula:

wherein R$_1$ is hydrogen or a C$_1$-C$_{30}$ hydrocarbyl group; and p is an integer from about 600 to about 7,000.

Embodiment 15 relates to the method of Embodiment 14, wherein R$_1$ is a C$_1$-C$_{30}$ hydrocarbyl group.

Embodiment 16 relates to the method of Embodiment 15, wherein R$_1$ is a C$_1$-C$_5$ alkyl group.

Embodiment 17 relates to the method of Embodiments 1-16, wherein the polyvinyl alcohol has a molecular weight of about 500 g/mol to about 200,000 g/mol.

Embodiment 18 relates to the method of Embodiments 1-17, wherein polylactic acid polymer has a molecular weight of about 1,000 g/mol to about 150,000 g/mol.

Embodiment 19 relates to the method of Embodiments 1-18, wherein the treatment fluid comprises a fracturing fluid, remedial treatment fluid or stimulation fluid.

Embodiment 20 relates to the method of Embodiments 1-19, wherein the treatment fluid comprises a fracturing fluid.

Embodiment 21 relates to the method of Embodiments 1-20, wherein the viscosifier polymer comprises at least one of polyacrylamides; hydrolyzed polyacrylamides; xanthan; scleroglucan; cellulose; carboxymethylhydroxymethyl cellulose; carboxymethylhydroxyethyl cellulose; polysaccharides; amphoteric polymers made from at least one of acrylamide, acrylic acid, and diallyldimethylammonium chloride; vinyl sulfonate/vinyl amide/acrylamide terpolymers; vinyl sulfonate/acrylamide copolymers; acrylamide/acrylamido-methylpropanesulfonic acid copolymers; acrylamide/vinylpyrrolidone copolymers; sodium carboxymethyl cellulose; poly[dialkylaminoacrylate-co-acrylate-graftpoly(ethyleneoxide)]; acrylamide/octadecyldimethylammoniummethyl methacrylate bromide copolymer; dimethylaminoethyl; methacrylate/vinyl pyrrolidone/hexadecyldimethylammoniumethyl methacrylate bromide terpolymer; and acrylamide/2-acrylamido-2-methyl propane sulfonic acid/2-ethylhexyl methacrylate terpolymer.

Embodiment 22 relates to the method of Embodiment 21, wherein the viscosifier polymer comprises carboxymethylhydroxymethylcellulose.

Embodiment 23 relates to the method of Embodiments 1-22, wherein the aqueous carrier fluid comprises at least one of seawater, produced water, flowback water, and saltwater.

Embodiment 24 relates to the method of Embodiments 1-23, wherein high total dissolved solids comprises total dissolved solids ranging from about 50,000 mg/L to about 200,000 mg/L.

Embodiment 25 relates to the method of Embodiments 1-24, wherein the treatment fluid further comprises a crosslinking agent comprising at least one of chromium, aluminum, antimony, zirconium, titanium, calcium, boron, iron, silicon, copper, zinc, magnesium, and an ion thereof.

Embodiment 26 relates to the method of Embodiment 25, wherein the crosslinking agent comprises at least one of boric acid, borax, a borate, a (C$_1$-C$_{30}$)hydrocarbylboronic acid, a (C$_1$-C$_{30}$)hydrocarbyl ester of a (C$_1$-C$_{30}$)hydrocarbylboronic acid, a (C$_1$-C$_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate.

Embodiment 27 relates to the method of Embodiments 1-26, wherein the treatment fluid has a pH of from about 7.5 to about 10.

Embodiment 28 relates to the method of Embodiments 1-27, wherein the treatment fluid has a viscosity at 140° C. and at a shear rate of about 0.1 s$^{-1}$ to about 100 s$^{-1}$ of about 2,000 cP to about 5,000 cP.

Embodiment 29 relates to the method of Embodiments 1-28, wherein the composition further comprises a proppant, a resin-coated proppant, or a combination thereof.

Embodiment 30 relates to the method of Embodiments 1-29, wherein the placing of the treatment fluid in the subterranean formation comprises pumping the treatment fluid through a drill string disposed in a wellbore, through a drill bit at a downhole end of the drill string, and back above-surface through an annulus.

Embodiment 31 relates to the method of Embodiment 30, further comprising processing the treatment fluid exiting the annulus with at least one fluid processing unit to generate a cleaned treatment fluid and recirculating the cleaned treatment fluid through the wellbore.

Embodiment 32 relates to the method of Embodiments 1-31, wherein the treatment fluid further comprises an aqueous base, oil, organic solvent, synthetic fluid oil phase, alcohol or polyol, starch, density control agent, density modifier, emulsifier, dispersant, polymeric stabilizer, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, weight reducing additive, heavy-weight additive, lost circulation material, filtration control additive, fibers, thixotropic additive, breaker, rheology modifier, curing accelerator, curing retarder, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, a hydratable clay, microspheres, pozzolan lime, or a combination thereof.

Embodiment 33 relates to a system configured to perform the method of Embodiments 1-32, the system comprising the treatment fluid; and the subterranean formation comprising the treatment fluid therein.

Embodiment 34 relates to the system of Embodiment 33, further comprising a drillstring disposed in a wellbore, the drillstring comprising a drill bit at a downhole end of the drillstring; an annulus between the drillstring and the wellbore; and a pump configured to circulate the treatment fluid through the drill string, through the drill bit, and back above-surface through the annulus.

Embodiment 35 relates to the system of Embodiment 34, further comprising a fluid processing unit configured to process the composition exiting the annulus to generate a cleaned composition for recirculation through the wellbore.

Embodiment 36 relates to a composition comprising:
a viscosifier polymer;
a crosslinking agent;
an aqueous carrier fluid comprising high total dissolved solids; and
at least one of a polyvinyl alcohol homopolymer comprising a structure of the formula:

wherein $R_1$ is hydrogen or a $C_1$-$C_{30}$ hydrocarbyl group; n is an integer from about 1,000 to about 10,000, and
a polylactic acid homopolymer comprising a structure of the formula:

wherein $R_1$ is hydrogen or a $C_1$-$C_{30}$ hydrocarbyl group, p is an integer from about 600 to about 7,000;
wherein the treatment fluid has a viscosity at 140° C. and at a shear rate of about 0.1 s$^{-1}$ to about 1 s$^{-1}$ of about 1,500 cP to about 10,000 cP.

Embodiment 37 relates to a method comprising:
placing a treatment fluid comprising:
a viscosifier polymer;
a crosslinking agent;
an aqueous carrier fluid comprising high total dissolved solids; and
at least one of a polyvinyl alcohol homopolymer comprising a structure of the formula:

wherein $R_1$ is hydrogen or a $C_1$-$C_{30}$ hydrocarbyl group; n is an integer from about 1,000 to about 10,000, and
a polylactic acid homopolymer comprising a structure of the formula:

wherein $R_1$ is hydrogen or a $C_1$-$C_{30}$ hydrocarbyl group, p is an integer from about 600 to about 7,000;
wherein the treatment fluid has a viscosity at 140° C. and at a shear rate of about 0.1 s$^{-1}$ to about 1 s$^{-1}$ of about 1,500 cP to about 10,000 cP;
in a subterranean formation.

Embodiment 38 relates to a method comprising:
obtaining or providing a treatment fluid comprising:
a viscosifier polymer;
an aqueous carrier fluid; and
a polymer composition comprising at least one of polyvinyl alcohol and polylactic acid;
wherein the treatment fluid has a viscosity at 140° F. and at a shear rate of about 0.1 s$^{-1}$ to about 1 s$^{-1}$ of about 1,500 cP to about 10,000 cP even when the aqueous carrier fluid comprises high total dissolved solids; and
placing the treatment fluid in a subterranean formation.

What is claimed is:

1. A method comprising:
placing in a subterranean formation a treatment fluid comprising:
 a viscosifier polymer;
 a first aqueous carrier fluid comprising first total dissolved solids in a range from about 50,000 mg/L to about 200,000 mg/L;
 a polymer composition comprising a second aqueous carrier fluid and at least one of polyvinyl alcohol or polylactic acid, wherein the second aqueous carrier fluid comprises second total dissolved solids in a range from about 20,000 mg/L to about 250,000 mg/L; and
 wherein the treatment fluid has a viscosity at 140° F. and at a shear rate of about 0.1 s$^{-1}$ to about 1,000 s$^{-1}$ of about 30 cP to about 10,000 cP, and contains about 0.5 pptg to about 10 pptg of at least one of polyvinyl alcohol or polylactic acid.

2. The method of claim 1, wherein the polyvinyl alcohol comprises a polyvinyl alcohol homopolymer.

3. The method of claim 1, wherein the polyvinyl alcohol is about 80% to about 100% hydrolyzed.

4. The method of claim 1, wherein the polyvinyl alcohol comprises a structure of the formula:

wherein R$_1$ is hydrogen or a C$_1$-C$_{30}$ hydrocarbyl group; and n is an integer from about 1,000 to about 10,000.

5. The method of claim 1, wherein the polylactic acid comprises a polylactic acid homopolymer.

6. The method of claim 1, wherein the polylactic acid comprises a structure of the formula:

wherein R$_1$ is hydrogen or a C$_1$-C$_{30}$ hydrocarbyl group; and p is an integer from about 600 to about 7,000.

7. The method of claim 1, wherein the polyvinyl alcohol has a molecular weight of about 500 g/mol to about 200,000 g/mol.

8. The method of claim 1, wherein polylactic acid has a molecular weight of about 1,000 g/mol to about 150,000 g/mol.

9. The method of claim 1, wherein the treatment fluid comprises a fracturing fluid, remedial treatment fluid or stimulation fluid.

10. The method of claim 1, wherein the treatment fluid comprises a fracturing fluid.

11. The method of claim 1, wherein the viscosifier polymer comprises at least one of polyacrylamides; hydrolyzed polyacrylamides; xanthan; scleroglucan; cellulose; carboxymethylhydroxymethyl cellulose; carboxymethylhydroxyethyl cellulose; polysaccharides; amphoteric polymers made from at least one of acrylamide, acrylic acid, or diallyldimethylammonium chloride; vinyl sulfonate/vinyl amide/acrylamide terpolymers; vinyl sulfonate/acrylamide copolymers; acrylamide/acrylamido-methylpropanesulfonic acid copolymers; acrylamide/vinylpyrrolidone copolymers; sodium carboxymethyl cellulose; acrylamide/octadecyldimethylammoniummethyl methacrylate bromide copolymer; dimethylaminoethyl; methacrylate/vinyl pyrrolidone/hexadecyldimethylammoniumethyl methacrylate bromide terpolymer; or acrylamide/2-acrylamido-2-methyl propane sulfonic acid/2-ethylhexyl methacrylate terpolymer.

12. The method of claim 1, wherein the first aqueous carrier fluid comprises at least one of seawater, produced water, flowback water, or saltwater.

13. The method of claim 1, wherein the first total dissolved solids is in a range from about 100,000 mg/L to about 200,000 mg/L.

14. The method of claim 1, wherein the treatment fluid further comprises a crosslinking agent comprising at least one of chromium, aluminum, antimony, zirconium, titanium, calcium, boron, iron, silicon, copper, zinc, magnesium, or an ion thereof.

15. The method of claim 1, wherein the treatment fluid has a pH of from about 7.5 to about 10.

16. The composition of claim 1, wherein the treatment fluid has a viscosity at 140° C. and at a shear rate of about 0.1 s$^{-1}$ to about 100 s$^{-1}$ of about 2,000 cP to about 5,000 cP.

17. The method of claim 1, further comprising:
combining the viscosifier polymer and the aqueous carrier fluid to produce a viscosifier polymer composition; and
combining the polymer composition and the viscosifier polymer composition to produce the treatment fluid.

* * * * *